(12) United States Patent
Nakagawa

(10) Patent No.: US 8,677,323 B2
(45) Date of Patent: Mar. 18, 2014

(54) RECORDING MEDIUM STORING MONITORING PROGRAM, MONITORING METHOD, AND MONITORING SYSTEM

(75) Inventor: Yasushi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 12/026,106

(22) Filed: Feb. 5, 2008

(65) Prior Publication Data

US 2008/0216057 A1 Sep. 4, 2008

(30) Foreign Application Priority Data

Feb. 7, 2007 (JP) ................................. 2007-027678

(51) Int. Cl.
 *G06F 15/16* (2006.01)
 *G06F 15/173* (2006.01)
 *G06F 9/44* (2006.01)
 *G06F 9/445* (2006.01)
 *G06F 9/45* (2006.01)

(52) U.S. Cl.
 USPC .......... 717/127; 709/205; 709/217; 709/219; 709/223; 709/224; 717/101; 717/115; 717/125; 717/129; 717/140; 717/171; 717/174; 717/177

(58) Field of Classification Search
 None
 See application file for complete search history.

(56) References Cited

U.S. PATENT DOCUMENTS

| | | | | |
|---|---|---|---|---|
| 5,650,940 | A * | 7/1997 | Tonozuka et al. | 709/224 |
| 6,543,049 | B1 * | 4/2003 | Bates et al. | 717/129 |
| 6,959,320 | B2 * | 10/2005 | Shah et al. | 717/174 |
| 7,246,156 | B2 * | 7/2007 | Ginter et al. | 709/217 |
| 7,281,238 | B2 * | 10/2007 | Sasaki et al. | 717/127 |
| 7,370,092 | B2 * | 5/2008 | Aderton et al. | 717/101 |
| 7,472,039 | B2 * | 12/2008 | Yamamura et al. | 702/186 |
| 7,493,378 | B2 * | 2/2009 | Kawashima | 709/223 |
| 7,496,913 | B2 * | 2/2009 | Hayes et al. | 717/174 |
| 7,624,394 | B1 * | 11/2009 | Christopher, Jr. | 717/177 |
| 7,735,080 | B2 * | 6/2010 | Barturen et al. | 717/177 |

(Continued)

FOREIGN PATENT DOCUMENTS

| | | | |
|---|---|---|---|
| JP | A 11-161604 | 6/1999 | |
| JP | A 2000-20316 | 1/2000 | |

(Continued)

OTHER PUBLICATIONS

Rajkumar Buyya.,Parmon:a portable and scalable monitoring system for clusters, 2000, [Retrieved on Nov. 13, 2013]. Retrieved from the internet: <URL: http://ww2.cs.mu.oz.au/~raj/papers/parmon.pdf> 18 Pages (1-17).*

(Continued)

*Primary Examiner* — Don Wong
*Assistant Examiner* — Anibal Rivera
(74) *Attorney, Agent, or Firm* — Greer Burns & Crain Ltd.

(57) ABSTRACT

A recording medium readable by an information processing apparatus, has recorded thereon a monitoring program for monitoring an operation status of a monitoring target program that runs on an information processing apparatus having a processor and a memory. The monitoring program causes the information processing apparatus to obtain, at a time of installation of a program, information indicating a status where the program is executed in the information processing apparatus and becomes a monitoring target program. The program monitors, on the basis of the information obtained, whether the monitoring target program exists in a memory in which the monitoring target program has been loaded.

20 Claims, 14 Drawing Sheets

(56) References Cited

U.S. PATENT DOCUMENTS

| | | | |
|---|---|---|---|
| 7,818,741 B1* | 10/2010 | Bourdev | 717/174 |
| 2003/0009525 A1* | 1/2003 | Yasue | 709/205 |
| 2003/0163807 A1* | 8/2003 | Drake et al. | 717/174 |
| 2004/0040013 A1* | 2/2004 | Kalra | 717/129 |
| 2004/0068723 A1* | 4/2004 | Graupner et al. | 717/171 |
| 2004/0088399 A1* | 5/2004 | Minari | 709/223 |
| 2004/0162898 A1* | 8/2004 | Rich | 709/224 |
| 2005/0066312 A1* | 3/2005 | Barsness et al. | 717/129 |
| 2005/0246684 A1* | 11/2005 | Shiraishi | 717/115 |
| 2006/0090157 A1* | 4/2006 | Park et al. | 717/140 |
| 2006/0248525 A1* | 11/2006 | Hopkins | 717/177 |
| 2007/0088682 A1* | 4/2007 | Kitamura | 707/3 |
| 2007/0106984 A1* | 5/2007 | Birk Olsen et al. | 717/174 |
| 2007/0143446 A1* | 6/2007 | Morris | 709/219 |
| 2007/0240150 A1* | 10/2007 | Gangwar et al. | 717/174 |
| 2008/0115131 A1* | 5/2008 | Kelsey et al. | 718/100 |
| 2008/0115219 A1* | 5/2008 | Kim et al. | 726/25 |
| 2008/0120614 A1* | 5/2008 | Yamada | 717/175 |
| 2008/0288923 A1* | 11/2008 | Shimogori | 717/125 |
| 2009/0265707 A1* | 10/2009 | Goodman et al. | 718/1 |
| 2010/0125657 A1* | 5/2010 | Dowling et al. | 709/224 |

FOREIGN PATENT DOCUMENTS

| | | |
|---|---|---|
| JP | 2001-117789 | 4/2001 |
| JP | A 2004-21400 | 1/2004 |
| JP | A 2004-38567 | 2/2004 |

OTHER PUBLICATIONS

Long Fei et al., Monitoring Remotely Executing Shared Memory Programs in Software DSMs, 2006, [Retrieved on Nov. 13, 2013]. Retrieved from the internet: <URL: https://engineering.purdue.edu/~ychu/publications/ipdps06_monitor.pdf> 10 Pages (1-10).*

Japanese Office Action issued in corresponding Japanese App. No. 2007-027678, issued Sep. 20, 2011.

* cited by examiner

FIG. 7

| SERVER NAME 351 | PROCESS NAME 353 |
|---|---|
| AGENT SERVER 1 | PROCESS a1 |
| | PROCESS a2 |
| | PROCESS a3 |
| | PROCESS b1 |
| | PROCESS b2 |
| AGENT SERVER 2 | ⋮ |
| | ⋮ |

FIG. 10

| SERVER NAME 331 | PROGRAM NAME 333 |
|---|---|
| AGENT SERVER 1 | PROGRAM A |
|  | PROGRAM B |
| AGENT SERVER 2 | PROGRAM B |

| SERVER NAME | PROCESS NAME |
|---|---|
| AGENT SERVER 1 | PROCESS a1 |
| | PROCESS a2 |
| | PROCESS a3 |
| | PROCESS b1 |
| | PROCESS b2 |
| AGENT SERVER 2 | PROCESS b1 |
| | PROCESS b2 |

FIG. 13

| PROGRAM NAME 531 | PROCESS NAME 533 |
|---|---|
| PROGRAM A | PROCESS a1 |
| | PROCESS a2 |
| | PROCESS a3 |
| PROGRAM B | PROCESS b1 |
| | PROCESS b2 |

US 8,677,323 B2

RECORDING MEDIUM STORING MONITORING PROGRAM, MONITORING METHOD, AND MONITORING SYSTEM

BACKGROUND OF THE INVENTION

Field of the Invention

The present invention relates to techniques for monitoring whether a program installed on an information processing apparatus is running properly.

SUMMARY

According to an aspect of the present invention, a recording medium readable by an information processing apparatus, has recorded thereon a monitoring program for monitoring an operation status of a monitoring target program that runs on an information processing apparatus having a processor and a memory. The monitoring program causes the information processing apparatus to obtain, at a time of installation of a program, information indicating a status where the program is executed in the information processing apparatus and becomes a monitoring target program. The program monitors, on the basis of the information obtained, whether the monitoring target program exists in a memory in which the monitoring target program has been loaded.

BRIEF DESCRIPTION OF THE DRAWINGS

FIG. 7 is a diagram showing a configuration of a monitoring policy database;

FIG. 10 is a diagram showing a configuration of the configuration management database after an additional program has been registered;

FIG. 11 is a diagram showing a configuration of the monitoring policy database after an additional process has been registered;

FIG. 13 is a diagram showing a configuration of a monitoring target database;

DESCRIPTION OF THE PREFERRED EMBODIMENTS

Before describing an embodiment of the present invention, situations where the present invention is needed will be described. A monitoring target program in the present invention relates to a mission-critical task of a user, and is constantly in operation. If an abnormality occurs in the operation of the program, the user is very likely to suffer a severe damage. Thus, it is essential for the user to detect such an abnormality in the operation of the program as soon as it occurs. One method for detecting such an abnormality in the operation of the program is to monitor a status of execution of the program by an information processing apparatus. According to this method, it is assumed that an abnormality has occurred in the operation of the program if information indicating the status of execution is absent. However, a plurality of statuses exist for an installed program. Therefore, the user has to manually check the status of execution of a selected monitoring target program by an information processing apparatus, and to register, as a monitoring target, information indicating a status of execution of a selected monitoring target program by an information processing apparatus. According to the present invention, information indicating the relationship between each program that is installed and information indicating a status of execution of the program by an information processing apparatus is prepared. This information is referred to when a program is newly installed. This facilitates a procedure of registration of a monitoring target by a user. Now, an embodiment of the present invention will be described with reference to the drawings.

1. Scheme of the Embodiment

Figure 1:
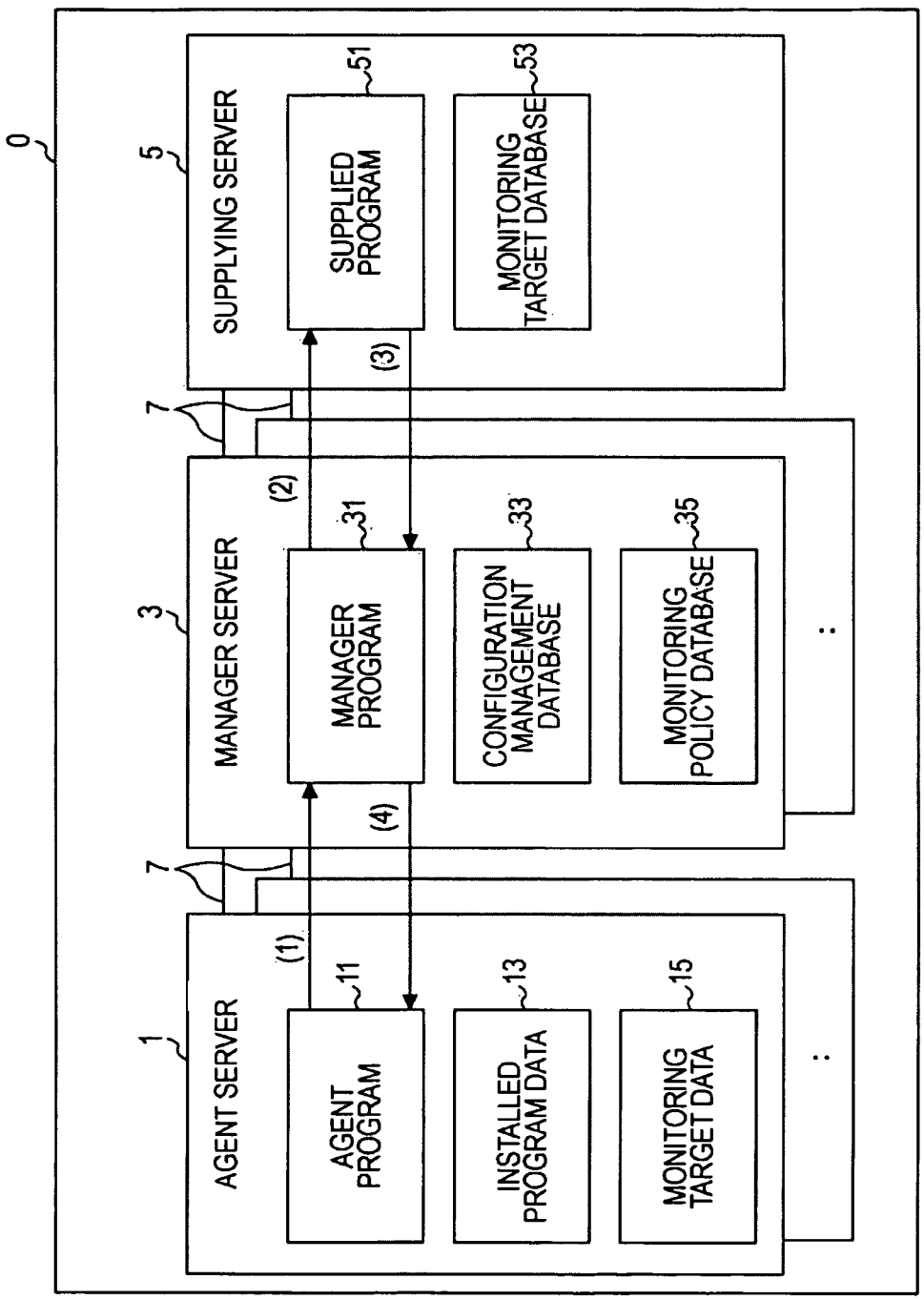
FIG. 1 is a diagram showing a scheme of an embodiment of the present invention.

FIG. 1 is a diagram showing the scheme of an embodiment of the present invention. In this embodiment, a program monitoring system 0 includes a plurality of agent servers 1, a plurality of manager servers 3, a supplying server 5, and a communication network 7 that connects these servers with each other. The number of the agent servers 1 and the number of the manager servers 3 may be changed arbitrarily by an administrator of the system. Each of these servers stores addresses of the other servers so that the servers can carry out communications with each other using the addresses. Now, the operations of the agent servers 1, the manager servers 3, and the supplying server 5 will be described briefly. Each of the agent servers 1, manager servers 3, and the supplying server 5 can act as an information processing apparatus.

(1) The agent server 1 reports the name of a program newly added to installed program data 13 and identification information identifying the agent server 1 to the manager server 3 via an agent program.

(2) The manager server 3 stores the program name reported in (1) in a configuration management database 33 via a manager program 31. This allows the manager server 3 to manage the agent server 1 that is to be monitored and programs installed on the agent server 1. Then, the program name reported in (1) is reported to the supplying server 5.

(3) The supplying server 5 extracts information indicating a status of execution of the program corresponding to the program name reported in (2) (i.e., extracts a process name), from a monitoring target database 53 via a supplying program 51. Then, the supplying server 5 reports the extracted process name to the manager server 3.

(4) The manager server 3 stores the information indicating the status of execution of the program by the information processing apparatus (i.e., the process name), reported in (3), in a monitoring policy database 35 via the manager program 31. Then, the manager server 3 reports the process name reported in (3) to the agent server 1. The agent server 1 stores the process name reported from the manager server 3 in monitoring target data 15 via the agent program 11. The process name is stored automatically by the manager server 3 or manually by a user. When the process name is stored automatically, advantageously, the user is freed from the task of manually registering a monitoring target. On the other hand, when the process name is stored manually, the user need not check the information indicating the status of execution of the program by the information processing apparatus. The agent server 1 executes monitoring on the basis of the monitoring target data 15. More specifically, the agent server 1 regularly monitors whether a process corresponding to the process name stored in the monitoring target data, i.e., a process corresponding to the information indicating the status of execution of the program by the information processing apparatus, exists in a memory of the agent server 1.

Now, the configurations and operations of the servers described above will be described in detail.

2. Hardware Configuration of the Agent Server

Figure 2:
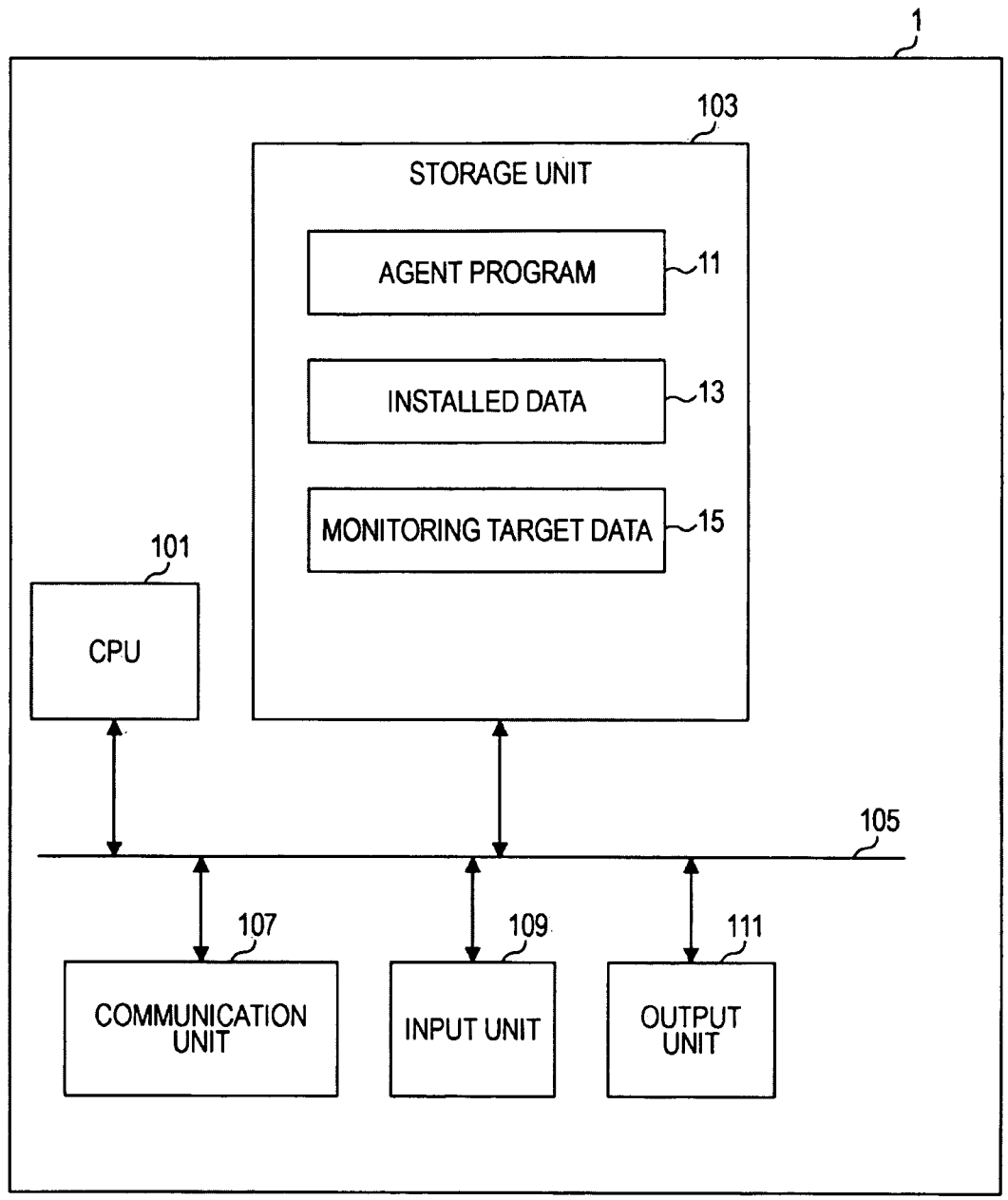
FIG. 2 is a diagram showing a hardware configuration of an agent server.

FIG. 2 is a diagram showing an example of hardware configuration of the agent server 1. The agent server 1 includes a central processing unit (CPU) 101, a storage unit 103, a bus 105, a communication unit 107, an input unit 109, and an output unit 111. The CPU 101 controls other components of the agent server 1 and executes various operations. The storage unit 103 stores the agent program 11, the installed program data 13, and the monitoring target data 15. Furthermore, the storage unit 103 also operates as a random access memory (RAM), in which programs are executed and data is stored, a read-only memory (ROM), in which programs and data are stored, and an external storage device that can store a large volume of programs and data. The agent program 11 obtains from the manager server 3 information indicating a status of execution of a program by an information processing apparatus, the program corresponding to a program newly installed on the agent server 1. Furthermore, using this information indicating the status of execution of the program, the agent program 11 monitors whether the newly installed program is running properly. The installed program data 13 includes names of programs installed on the agent server 1. The installed program data 13 is used when the agent server 1 detects a newly installed program and when the agent server 1 outputs a result of monitoring a program. The monitoring target data 15 includes information indicating a status of execution of a monitoring target program by an information processing program. The information indicating the status of execution of the program by the information processing apparatus is used when the agent server 1 identifies a monitoring target. The communication unit 107 carries out communications with the manager server 3. The input unit 109 supplies a request from outside regarding monitoring of a program to the agent server 1. The input unit 109 corresponds to a keyboard, a mouse, or the like. The output unit 111 sends out information regarding monitoring of a program. The output unit 111 corresponds to a monitor, a speaker, or the like. The bus 105 allows data exchange between the CPU 101 and the storage unit 103, the communication unit 107, the input unit 109, and the output unit 111.

2.1. Functions of the Agent Server

Figure 3:
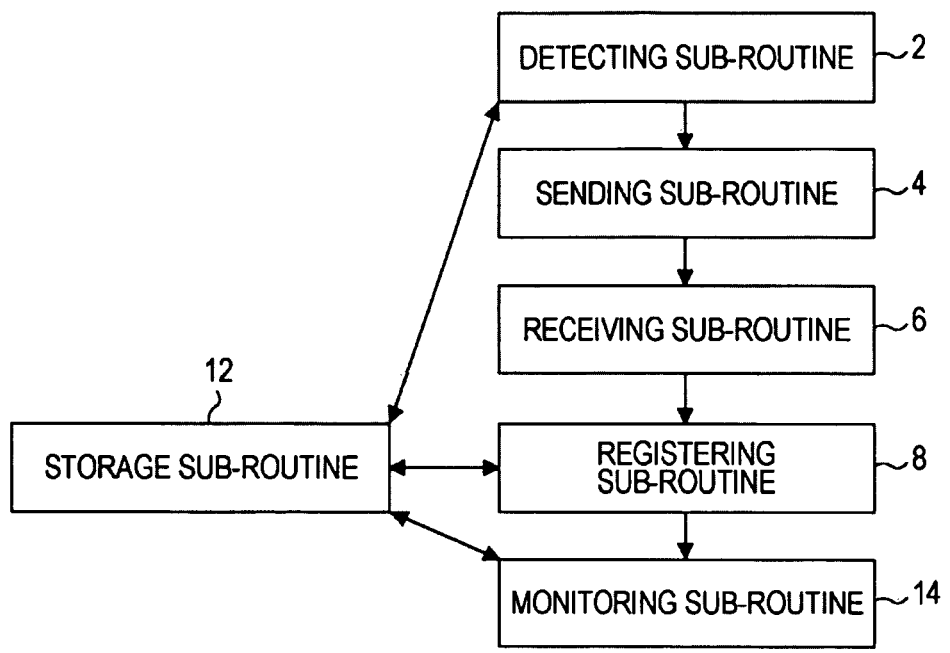
FIG. 3 is a functional block diagram of the agent server.

FIG. 3 is a block diagram showing an example of functions of the agent server 1 in this embodiment. The functions of the agent server 1 are realized by execution of the agent program 11. The agent program 11 includes a detecting sub-routine 2, sending sub-routine 4, receiving sub-routine 6, registering sub-routine 8, storage sub-routine 12, and monitoring sub-routine 14. These sub-routine will be described below.

Detecting Sub-Routine

The detecting sub-routine 2 regularly monitors the installed program data 13 to detect the name of a program that has been newly installed, if any.

Sending Sub-Routine

The sending sub-routine 4 sends the program name detected by the detecting sub-routine 2 and identification information identifying the agent server 1 to the manager server 3. This processing serves to obtain information indicating a status of execution of a program by an information processing apparatus, the program corresponding to the name of the newly installed program.

Receiving Sub-Routine

The receiving sub-routine 6 receives the information sent from the manager server 3, indicating the state of execution of the program by the information processing apparatus. The information indicating the status of execution of the program by the information processing apparatus corresponds to the program name sent by the sending sub-routine 4.

Registering Sub-Routine

The registering sub-routine 8 stores the information indicating the status of execution of the program by the information processing apparatus, received by the receiving sub-routine 6, in the storage sub-routine 12.

Storage Sub-Routine

The storage sub-routine 12 stores the monitoring target data 15, in which the information indicating the status of execution of the program by the information processing apparatus, received by the receiving sub-routine 6, is stored.

Monitoring Sub-Routine

The monitoring sub-routine 14 regularly monitors whether a process corresponding to the information indicating the status of execution of the program by the information processing apparatus, registered by the registering sub-routine 8, exists in a memory.

2.2. Procedure of Processing Executed by the Agent Server

Figure 4:
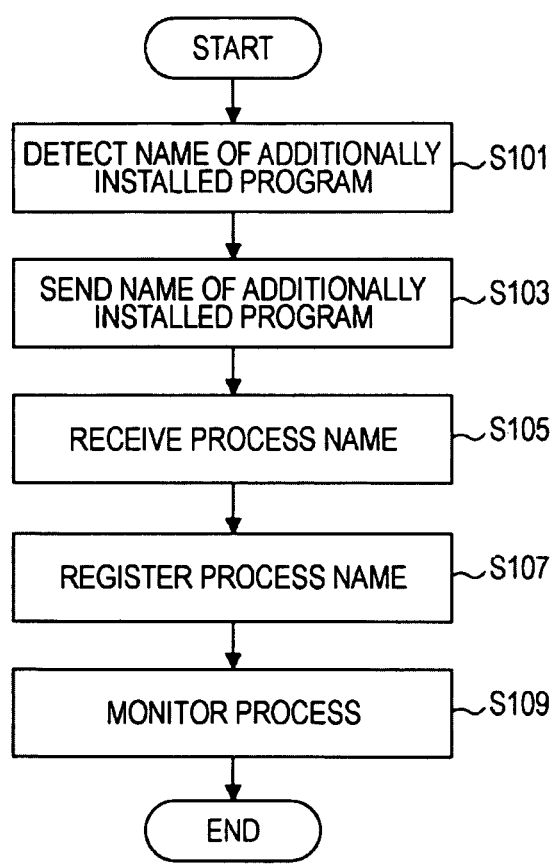
FIG. 4 is a flowchart showing a procedure of processing executed by the agent server.

FIG. 4 is a flowchart showing a procedure of processing executed by the agent server 1 in this embodiment.

In step S101, the detecting sub-routine 2 regularly monitors the installed program data 13 to detect the name of a program that has been newly installed, if any. In the following description, it is assumed that the agent server 1 has detected a newly installed program B.

In step S103, the sending sub-routine 4 sends the program name detected in step S101 and identification information identifying the agent server 1 to the manager server 3 via the communication unit 107. The identification information is information stored in the storage unit 103, and more specifically, the identification information represents a server name. In this example, "Agent server 1" representing a server name and "Program B" representing a program name are sent to the manager server 3.

In step S105, the receiving sub-routine 6 receives information indicating a status of execution of the program by an information processing apparatus, sent from the manager server 3. The information indicating the status of execution of the program by the information processing apparatus corresponds to the program name sent in step S103. In this example, process names "Process b1" and "Process b2" are received as the information indicating the status of execution of the program by the information processing apparatus. The process names "Process b1" and "Process b2" are stored as information corresponding to the program B in the monitoring target database 53 of the supplying server 5, which will be described later.

In step S107, the registering sub-routine 8 stores in the monitoring target data 15 the information indicating the status of execution of the program by the information processing apparatus. In this example, the process names "Process b1" and "Process b2" are stored in the monitoring target data 15.

In step S109, using the information indicating the status of execution of the program by the information processing apparatus, registered in step S107, the monitoring sub-routine 14 regularly monitors whether processes corresponding to the information exist in the memory. This monitoring is executed using a function (command or API (application program interface)) for obtaining a list of processes running on the agent server 1. If the processes exist in the memory, the monitoring sub-routine 14 assumes that a normal status exists, so that no special processing is executed. On the other hand, if the processes do not exist in the memory, the monitoring sub-routine 14 assumes an abnormal state, so that the monitoring sub-routine 14 sends the process names of the absent processes to the manager server 3 via the communication unit 107. In this example, the monitoring sub-routine 14 regularly monitors whether the process b1 and the process b2 exist in the memory.

3. Hardware Configuration of the Manager Server

Figure 5:
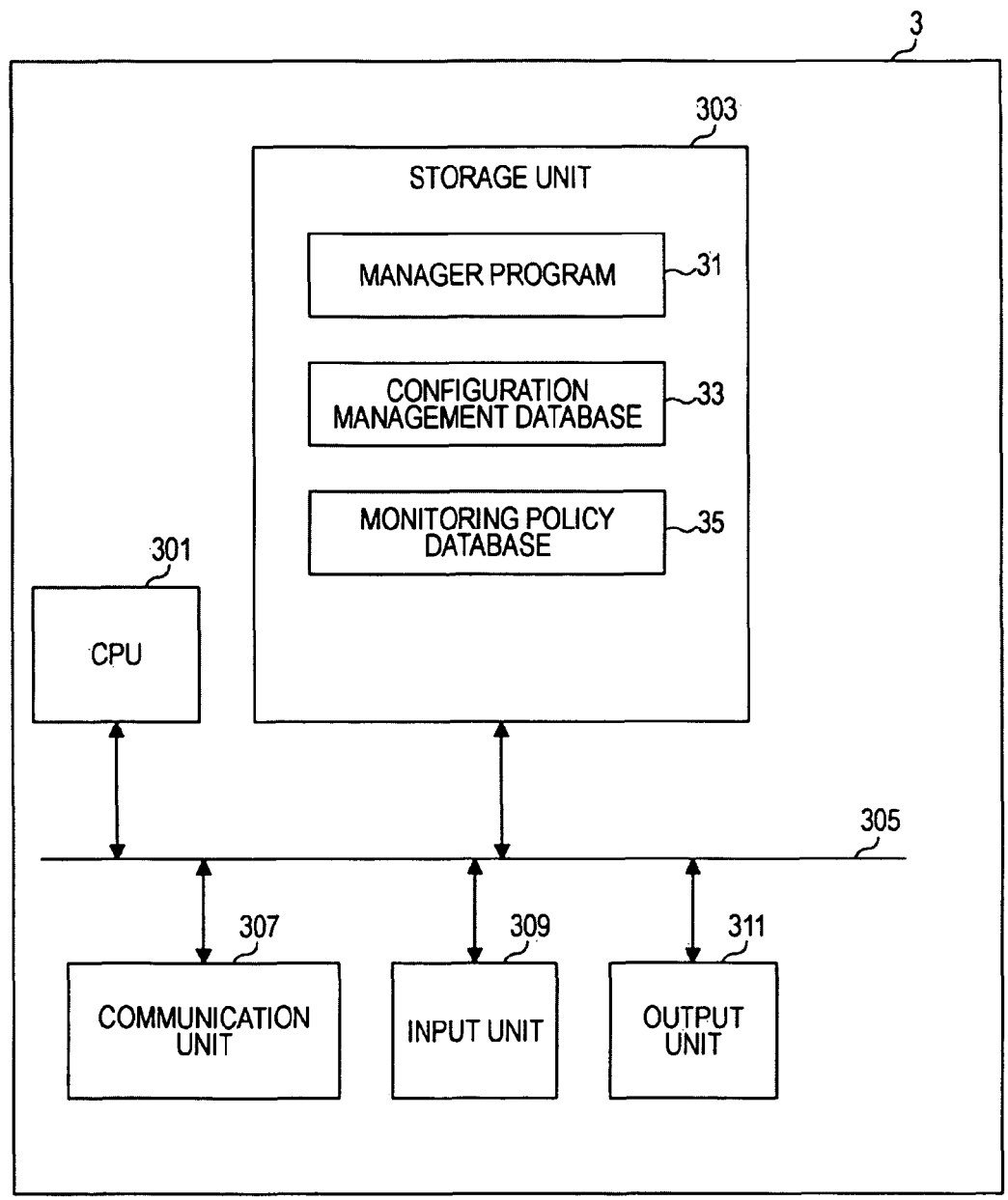
FIG. 5 is a diagram showing a hardware configuration of a manager server.

FIG. 5 is a diagram showing an example of the hardware configuration of the manager server 3. The manager server 3 includes a central processing unit (CPU) 301, a storage unit 303, a bus 305, a communication unit 307, an input unit 309, and an output unit 311. The CPU 301 controls other components of the manager server 3 and executes various operations. The storage unit 303 stores a manager program 31, the configuration management database 33, and the policy management database 35. Furthermore, the storage unit 303 also operates as a random access memory (RAM), in which programs are executed and data is stored, a read-only memory (ROM), in which programs and data are stored, and an external storage device that can store a large volume of programs and data. The manager program 31 controls the operation of the manager server 3 as follows. The manager server 3 stores the name of the newly added program, reported from the agent server 1, in the configuration management database 33. Then, the manager server 3 obtains information indicating a status of execution of the program by an information processing apparatus from the supplying server 5, the program corresponding to the name of the newly added program. Then, the manager server 3 stores the information in the monitoring policy database 35. Then, the manager server 3 sends the information to the agent server 1 via the communication unit 307.

The configuration management database 33 serves to manage programs that have been installed on the agent server 1 and that are managed by the manager server 3. The monitoring policy database 35 serves to manage information indicating a status of execution of a program by an information processing apparatus, the program being a program monitored by the agent server 1 managed by the manager server 3. The communication unit 307 carries out communications with the agent server 1 or the supplying server 5. The input unit 309 supplies a request from outside regarding monitoring of a program to the agent server 1. The input unit 309 corresponds to a keyboard, a mouse, or the like. The output unit 311 sends out information regarding monitoring of a program. The output unit 311 corresponds to a monitor, a speaker, or the like. The bus 305 allows exchange of data between the CPU 301 and the storage unit 303, the communication unit 307, the input unit 309, and the output unit 311.

3.1. Configuration of the Configuration Management Database

Figure 6:
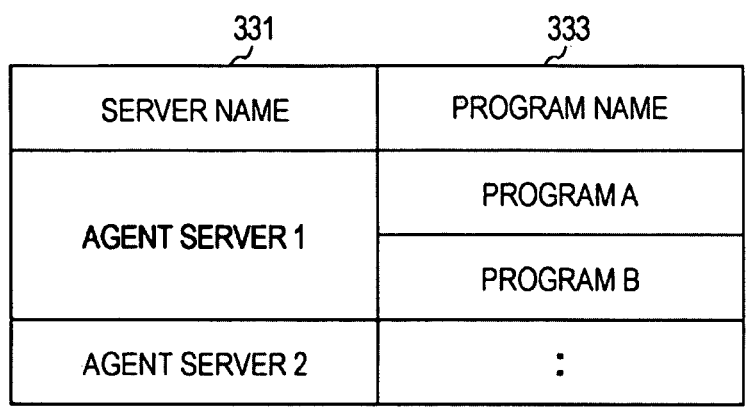
FIG. 6 is a diagram showing a configuration of a configuration management database.

FIG. 6 shows the configuration management database 33 storing program names reported from the agent server 1. Information elements of the configuration management database 33 are server name 331 and program name 333. The server name 331 is used when the manger server identifies a server that is managed. The program name 333 is used when the manager server 3 identifies a program installed on the server that is managed. The program name 333 is also used when the manager server 3 obtains a process name corresponding to the program from the supplying server 5.

3.2. Configuration of the Monitoring Policy Database

FIG. 7 shows the monitoring policy database 35 storing process names reported from the supplying server 5. Information elements of the monitoring policy database 35 are server name 351 and process name 353. The server name 351 is used when the manager server 3 identifies a server that is managed. The process name 353 is information indicating a status of execution of a program corresponding to the server.

3.3. Functions of the Manager Server

Figure 8:
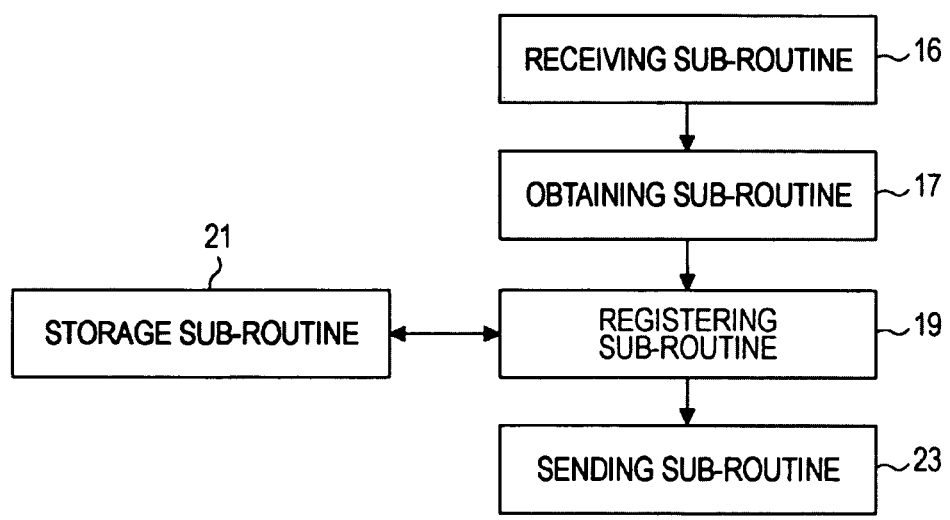
FIG. 8 is a functional block diagram of the manager server.

FIG. 8 is a block diagram showing an example of functions of the manager sever 3 in this embodiment. The functions of the manager server 3 are realized by execution of the manager program 31. The manager program 31 includes a receiving sub-routine 16, obtaining sub-routine 17, registering sub-routine 19, storage sub-routine 21, and sending sub-routine 23. These sub-routine will be described below.

Receiving Sub-Routine

The receiving sub-routine 16 receives a program name and a server name sent by the sending sub-routine 4 of the agent server 1.

Obtaining Sub-Routine

The obtaining sub-routine 17 registers the program name received by the receiving sub-routine 16 in the configuration management database 33. Then, the obtaining sub-routine 17 sends the received program name to the supplying server 5. This processing serves to obtain information indicating a status of execution of a program corresponding to the received program name by an information processing apparatus.

Registering Sub-Routine

The registering sub-routine 19 stores the information indicating the status of execution of the program by the information processing apparatus, received by the obtaining sub-routine 17, in the storage sub-routine 21.

Storage Sub-Routine

The storage sub-routine 21 stores the configuration management database 33 storing the program name received by the receiving sub-routine 16, and the monitoring policy database 35 storing the information indicating the status of execution of the program by the information processing apparatus, obtained by the obtaining sub-routine 17.

Sending Sub-Routine

The sending sub-routine 23 sends the information indicating the status of execution of the program by the information processing apparatus, stored by the registering sub-routine 19, to the agent server 1.

3.4. Procedure of Processing Executed by the Manager Server

Figure 9:
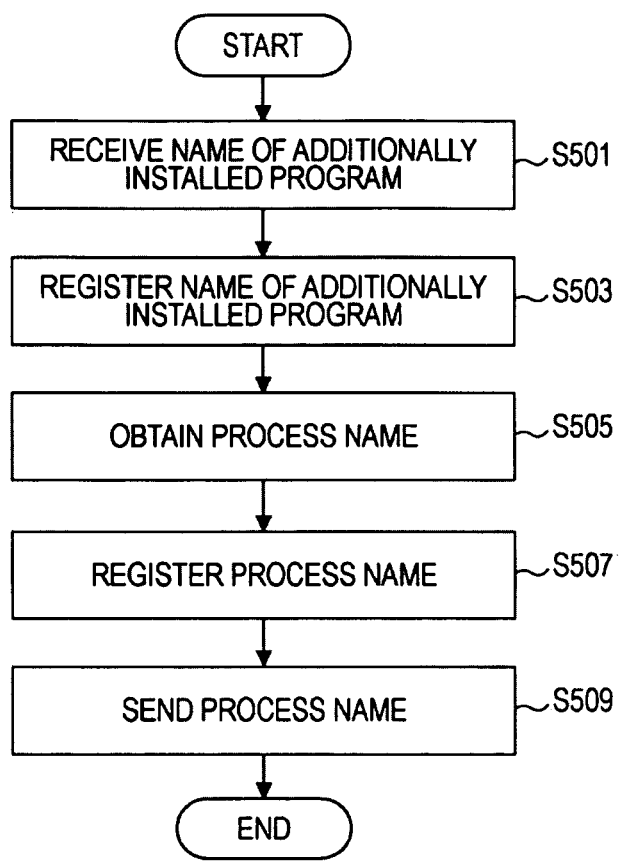
FIG. 9 is a flowchart showing a procedure of processing executed by the manager server.

FIG. 9 is a flowchart showing a procedure of processing executed by the manager server 3 in this embodiment.

In step S501, the receiving sub-routine 16 receives a program name and a server name from the agent server 1 via the communication unit 307. The following description will be given assuming that "Agent server 1" as the server name and "Program B" as the program name are received.

In step S503, the receiving sub-routine 16 registers the received program name in the configuration management database 33. In this example, the program name "Program B" is stored in the configuration management database 33.

3.5. Example of the Configuration Management Database with Added Information

FIG. 10 shows an example of the configuration management database 33 after execution of step S503. The information elements of the configuration management database 33 are the server name 331 and the program name 333, as described earlier with reference to FIG. 6. Referring to FIG. 10, a program name is additionally included as indicated by 335, which corresponds to the program name registered in step S503.

Now, the description of the procedure of processing executed by the manager server 3 will be continued referring back to FIG. 9.

In step S505, the obtaining sub-routine 17 obtains a process name from the monitoring target database 53 stored in the supplying server 5 via the communication unit 307, the process name obtained being a process name corresponding to the program name detected by the receiving sub-routine 16. The process name serves as information indicating a status of execution of the program by an information processing apparatus. The status of execution refers to a status where a monitoring target program is loaded in a memory of the agent server 1. Furthermore, the status of execution refers to a status where the program is constantly resident unless an abnormality occurs. The abnormality refers to, for example, accidental termination of the program by a user or forcible termination of the program due to a bug. Furthermore, a plurality of statuses of execution can exist for one monitoring target program. This is because an operating system (OS) that runs on the agent server 1 controls the program on a basis of individual units of the program loaded in the memory according to the specification of the CPU 101. In this example, as information indicating a status of execution of the program by the information processing apparatus, process names "Process b1" and "Process b2" are received. The process names "Process b1" and "Process b2" are stored as information corresponding to the program B in the monitoring target database 53 of the supplying server 5, which will be described later.

In step S507, the registering sub-routine 19 stores the process names obtained by the obtaining sub-routine 4 in the monitoring policy database 35. The process names serve as information indicating a status of execution of the program by an information processing apparatus. Furthermore, the process names are used when the manager server 3 identifies processes associated with a server that is managed. In this example, the process names "Process b1" and "Process b2" are stored in the monitoring policy database 35.

3.6. Example of the Monitoring Policy Database with Added Information

FIG. 11 shows an example of the monitoring policy database 36 after execution of step S507. The information elements of the monitoring policy database 35 are the server name 351 and the process name 353, as described earlier with reference to FIG. 7. Referring to FIG. 11, the process names registered in step S507 have been added, as indicated by 355. The process names serve as information indicating a status of execution of a program by an information processing apparatus.

Referring back to FIG. 9, the description of the procedure of processing executed by the manager server 3 will be continued.

In step S509, the sending sub-routine 23 reports the process names obtained by the obtaining sub-routine 17 to the agent server 1 storing the program corresponding to the program name detected by the detecting sub-routine 2. The process names serve as information indicating a status of execution of the program by an information processing apparatus. In this example, the process names "Process b1" and "Process b2" are sent to an agent server 2.

4. Hardware Configuration of the Supplying Server

Figure 12:
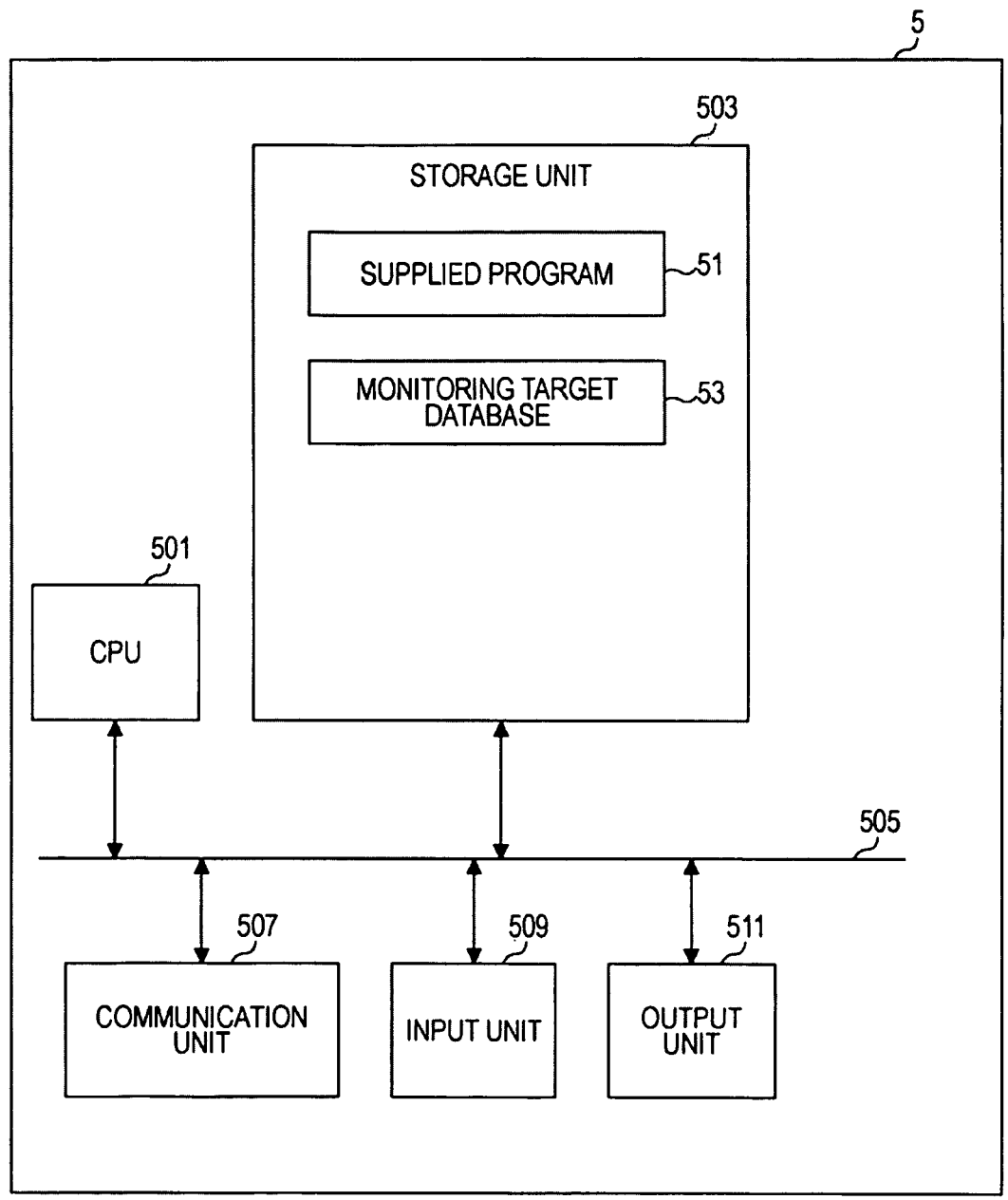
FIG. 12 is a diagram showing a hardware configuration of a supplying server.

FIG. 12 shows an example of hardware configuration of the supplying server 5. The supplying server 5 includes a CPU 501, a storage unit 503, a bus 505, a communication unit 507, an input unit 509, and an output unit 511. The CPU 501 controls other components of the supplying server 5 and executes various operations. The storage unit 503 stores a supplying program 51 and a monitoring policy database 53. Furthermore, the storage unit 503 also operates as a random access memory (RAM), in which programs are executed and data is stored, a read-only memory (ROM), in which programs and data are stored, and an external storage device that can store a large volume of programs and data. The supplying program 51 returns a process name stored in the monitoring target database 53 in response to a request from the manger server 3. The process name serves as information indicating a status of execution of the program by an information processing apparatus.

The monitoring target database 53 serves to manage the relationship between program names and process names managed by the supplying server 5. The communication unit 507 carries out communications with the manager server 3. The input unit 509 supplies a request from outside regarding monitoring of a program to the agent server 1. The input unit 509 corresponds to a keyboard, a mouse, or the like. The output unit 511 sends out information regarding monitoring of a program. The output unit 511 corresponds to a monitor, a speaker, or the like. The bus 505 allows exchange of data between the CPU 501 and the storage unit 530, the communication unit 507, the input unit 509, and the output unit 511.

4.1. Configuration of the Monitoring Target Database

FIG. 13 shows the monitoring target database 53 storing the process names of processes associated with programs installed on the agent server 1. Information elements of the monitoring target database 53 are program name 531 and process name 533. The program name 531 represents the program names of programs installed on the agent server 1. The program name 531 is used to obtain a process name 533 associated with the program name detected by the manager server 3. The process name 533 serves as information indicating a status of execution of a program by an information processing apparatus. Furthermore, the process name 533 is used by the agent server 3 to monitor an installed program.

4.2. Functions of the Supplying Server

Figure 14:
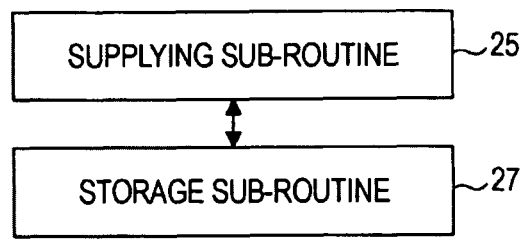
FIG. 14 is a functional block diagram of the supplying server.

FIG. 14 is a block diagram showing an example of functions of the supplying server 5. The functions of the supplying server 5 are realized by execution of the supplying program 51. The supplying program 51 includes a supplying sub-routine 25 and storage sub-routine 27. These sub-routines will be described below.

Supplying Sub-Routine

The supplying sub-routine 25 receives a program name from the obtaining sub-routine 19 of the manager server 3. Then, the supplying sub-routine 25 extracts from the monitoring target database 53 information indicating a status of execution of a program by an information processing apparatus, the program corresponding to the program name received. Then, the supplying sub-routine 25 sends the information to the obtaining sub-routine 19 of the manager server 3.

Storage Sub-Routine

The storage sub-routine 27 stores the monitoring target database 53 storing relationship between program names and information indicating statuses of execution of programs by information processing apparatuses.

4.3. Procedure of Processing Executed by the Supplying Server

Figure 15:
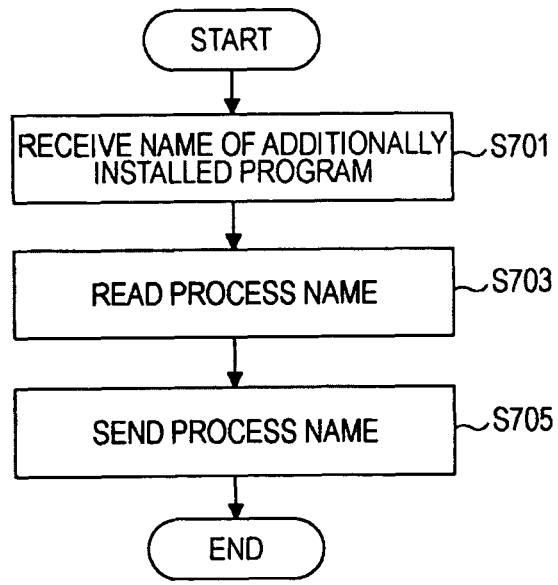
FIG. 15 is a flowchart showing a procedure of processing executed by the supplying server.

FIG. 15 is a flowchart showing a procedure of processing executed by the supplying server 5 in this embodiment.

In step S701, the supplying sub-routine 25 receives a program name from the manager server 3 via the communication unit 507. The following description will be given assuming that "Program B" is received as the program name.

In step S703, the supplying sub-routine 25 reads process names corresponding to the received program name from the monitoring target database 53. The process names serve as information indicating a status of execution of a program by an information processing apparatus. In this example, process names "Process b1" and "Process b2" are read as information corresponding to the program B.

In step S705, the supplying sub-routine sends the process names that have been read to the manager server 3 via the communication unit 507. In this example, the process names "Process b1" and "Process b2" are sent to the manager server 3.

Although the present invention has been described in the context of an embodiment, the present invention is not limited to the embodiment described above, and may be embodied in various manners within the scope of the appended claims.

What is claimed is:

1. A monitoring system comprising:
   a first computer including a first memory and a first processor coupled to the first memory; and
   a second computer including a storage device and a second processor coupled to the storage device,
   wherein the first processor is configured to:
      send a request with respect to a certain program, to the second computer,
   wherein the second processor is configured to:
      in response to receiving the request from the first computer, transmit identification information indicating at least one process stored in the storage device in association with the certain program, the at least one process being loaded in the first memory when the certain program is executed; and
   wherein the first processor is further configured to:
      receive the identification information from the second computer; and
      monitor whether the at least one process indicated by the received identification information exists in the first memory.

2. The monitoring system according to claim 1, wherein the storage device stores the identification information of the at least one process, which is a target of monitoring to confirm a status of execution of the certain program, in association with the certain program.

3. The monitoring system according to claim 1,
   wherein the first processor is further configured to:
      notify with respect to the certain program when the at least one process indicated by the received identification information does not exist in the first memory.

4. The monitoring system according to claim 1, further comprising a third computer including a second memory and a third processor coupled to the second memory,
   wherein the third processor is configured to:
      receive the request from the first computer,
      transmit the request to the second computer,
      receive the identification information from the second computer, and
      transmit the received identification information to the first computer,
   wherein the first processor is configured to:
      send the request to the third computer, and
      receive the identification information from the second computer through the third computer.

5. The monitoring system according to claim 4, wherein the certain program is installed on the first computer.

6. A monitoring method comprising:
   receiving, by a second computer, a request with respect to a certain program from a first computer;
   transmitting, by the second computer, identification information indicating at least one process stored in a storage device in association with the certain program, to the first computer, the at least one process being loaded in a first memory of the first computer when the certain program is executed; and
   in the case of receiving the identification information from the second computer, monitoring, by the first computer, whether the at least one process indicated by the received identification information exists in the first memory.

7. The monitoring method according to claim 6, wherein the storage device stores the identification information of the at least one process, which is a target of monitoring to confirm a status of execution of the certain program, in association with the certain program.

8. The monitoring method according to claim 6, further comprising:
   notifying with respect to the certain program by the first computer when it is determined that the at least one process indicated by the received identification information does not exist in the first memory by the monitoring.

9. The monitoring method according to claim 6, further comprising:
   sending, by the first computer, the request to a third computer;
   transmitting, by the third computer, the request to the second computer;
   receiving, by the third computer, the identification information from the second computer; and
   transmitting, by the third computer, the received identification information to the first computer.

10. The monitoring method according to claim 6, further comprising:
    installing the certain program in the first computer; and
    sending the request when the certain program is installed in the first computer by the installing.

11. A non-transitory computer readable recording medium storing a monitoring program for causing a first computer including a memory to execute a procedure, the procedure comprising:
    sending a request with respect to a certain program;
    receiving identification information from a second computer, the identification information being returned by the second computer in response to receiving of the request and indicating at least one process stored in a storage device in association with the certain program, the at least one process being loaded in the memory when the certain program is executed; and monitoring whether the at least one process indicated by the received identification information exists in the memory.

12. The recording medium according to claim 11, wherein the storage device stores the identification information of the at least one process, which is a target of monitoring to confirm a status of execution of the certain program, in association with the certain program.

13. The recording medium according to claim 11, the procedure further comprises:
notifying with respect to the certain program when it is determined that the at least one process indicated by the received identification information does not exist in the memory by the monitoring.

14. The recording medium according to claim 11, wherein the sending sends the request to a third computer, and
wherein the third computer transmits the request to the second computer, receives the identification information from the second computer, and transmits the received identification information to the first computer.

15. The recording medium according to claim 11, wherein the sending sends the request when the certain program is installed in the first computer.

16. A monitoring apparatus comprising:
a memory; and
a processor coupled to the memory and configured to:
send a request with respect to a certain program,
store identification information received from a managing apparatus in the memory, the identification information being returned by the second computer in response to receiving of the request and indicating at least one process stored in a storage device in association with the certain program, the at least one process being loaded in the memory when the certain program is executed, and
monitor whether the at least one process indicated by the identification information stored in the memory exists.

17. The monitoring apparatus according to claim 16, wherein the processor sends the request when the certain program is installed in the monitoring apparatus.

18. A monitoring support apparatus comprising:
a transmitter; and
a processor coupled to the transmitter and configured to:
in response to receiving a request with respect to a certain program from a monitoring apparatus, obtain identification information indicating at least one process stored in a storage device in association with the certain program, the at least one process being loaded in a memory in the monitoring apparatus when the certain program is executed; and
control the transmitter to transmit the obtained identification information to the monitoring apparatus for monitoring whether the at least one process indicated by the identification information exists in a memory in the monitoring apparatus.

19. The monitoring support apparatus according to claim 18, wherein the storage device stores the identification information of the at least one process, which is target of monitoring to confirm a status of execution of the certain program, in association with the certain program.

20. The monitoring support apparatus according to claim 18, wherein the request includes a name of the certain program and the identification information indicates a name of the at least one process.

* * * * *